(12) United States Patent
Gryc et al.

(10) Patent No.: US 7,243,556 B2
(45) Date of Patent: Jul. 17, 2007

(54) AIRFLOW SENSOR

(75) Inventors: Bogna Gryc, East St. Paul (CA); Alfred Theodor Dyck, Winnipeg (CA)

(73) Assignee: E.H. Price Limited, Winnepeg, Manitoba (CA)

( * ) Notice: Subject to any disclaimer, the term of this patent is extended or adjusted under 35 U.S.C. 154(b) by 0 days.

(21) Appl. No.: 11/402,960

(22) Filed: Apr. 13, 2006

(65) Prior Publication Data

US 2006/0230825 A1   Oct. 19, 2006

(30) Foreign Application Priority Data

Apr. 13, 2005 (CA) ................. 2504074

(51) Int. Cl.
*G01F 1/46* (2006.01)
(52) U.S. Cl. ................. 73/861.65
(58) Field of Classification Search ........... 73/861.65, 73/861.52, 861.22, 861.66, 861.67
See application file for complete search history.

(56) References Cited

U.S. PATENT DOCUMENTS

| | | |
|---|---|---|
| 1,087,988 A | 2/1914 | Sheldon |
| 1,116,938 A | 10/1914 | Sheldon |
| 1,119,581 A | 12/1914 | Dodge |
| 1,145,222 A | 7/1915 | Wilkinson |
| 1,145,234 A | 7/1915 | Dodge |
| 1,192,761 A | 7/1916 | Dodge |
| 1,255,622 A | 2/1918 | McFarland |
| 1,508,017 A | 9/1924 | Greve |
| 3,831,448 A | 8/1974 | Kors et al. |
| 3,914,997 A | 10/1975 | Pinckney |
| 4,453,419 A | 6/1984 | Engelke |
| 4,546,655 A | 10/1985 | Victor |
| 4,717,159 A | 1/1988 | Alston et al. |
| 4,768,386 A | 9/1988 | Taddeo |

(Continued)

FOREIGN PATENT DOCUMENTS

CA        1210610        9/1986

OTHER PUBLICATIONS

Nailor Industries Inc., "Diamond Flow Sensor", p. 7, Mar. 1997.

(Continued)

*Primary Examiner*—Jewel Thompson
(74) *Attorney, Agent, or Firm*—Dickinson Wright PLLC; John M. Naber (57) ABSTRACT

An airflow sensor for use in a conduit. The sensor comprises stacked first, second and third portions positioned, in use, in the conduit to define a hub and a plurality of tubes. The hub is centrally disposed in the conduit and has first and second interior chambers, a streamlined upstream-facing surface, a downstream-facing surface and a sidewall connecting said upstream and downstream facing surfaces, said sidewall having defined therein one or more static pressure ports through which the first chamber communicates with the conduit interior. The tubes extend radially from the hub, transverse to the flow. Each tube has a streamlined upstream-facing surface having defined therein one or more total pressure ports; a downstream-facing surface; and an interior passage communicating with the second chamber and communicating with the conduit interior through said total pressure ports. Each static pressure port is located downstream from a respective tube.

20 Claims, 7 Drawing Sheets

U.S. PATENT DOCUMENTS

| | | | |
|---|---|---|---|
| 4,912,973 | A | 4/1990 | Milewski et al. |
| 5,036,711 | A | 8/1991 | Good |
| 5,099,686 | A | 3/1992 | Kohler |
| D333,994 | S | 3/1993 | Mesnard |
| 5,365,795 | A * | 11/1994 | Brower, Jr. ............... 73/861.65 |
| 5,481,925 | A | 1/1996 | Woodbury |
| 5,483,839 | A * | 1/1996 | Meunier .................. 73/861.66 |
| 5,773,726 | A | 6/1998 | Mahoney et al. |
| 5,969,266 | A * | 10/1999 | Mahoney et al. ........ 73/861.65 |
| 6,044,716 | A | 4/2000 | Yamamoto |
| 6,094,993 | A * | 8/2000 | Traina ..................... 73/861.65 |
| 6,134,972 | A * | 10/2000 | Streckert et al. ......... 73/861.65 |
| 6,237,426 | B1 | 5/2001 | Gryc et al. |
| 6,487,918 | B1 | 12/2002 | DeAngelis |
| 6,957,586 | B2 * | 10/2005 | Sprague ................... 73/861.22 |
| 7,089,805 | B2 * | 8/2006 | Yun et al. ................ 73/861.65 |

OTHER PUBLICATIONS

TITUS, "Retrofit Terminals" and Fan Powered Terminals, 3 pages, 1996.

ENVIRO-TEC, "Specifiers Guide", vol. 5, Winter 1997, 4 pages.

ANEMOSTAT, "Velocity Wing Airflow Sensor", Technical Bulletin, pp. 1-2, Feb. 17, 2004.

TITUS, "AeroCross Flow Sensor Application Guide", 7 pages, Mar. 4, 2002.

* cited by examiner

AIRFLOW SENSOR

CLAIM OF PRIORITY

This Application claims priority to and the benefit of Canadian Patent Application No. 2,504,074, filed Apr. 13, 2005, under 35 U.S.C. 119 which is incorporated by reference herein in its entirety.

FIELD OF THE INVENTION

Devices for sensing volumetric flow rate of a fluid in a conduit or duct, and more particularly, to multi-point, center-averaging airflow sensors used to measure total and static pressure of an air stream.

BACKGROUND OF THE INVENTION

In variable air volume (VAV) heating, ventilation and air conditioning (HVAC) systems, air flow through a duct system is varied to provide thermal comfort and proper ventilation. Multi-point, center-averaging sensors are typically provided at terminal box inlets in VAV systems to measure total and static pressure produced by air flowing through the duct system. The difference between these two measurements, known as "differential pressure," is proportional to air flow through the duct system. Total and static pressure measurements, which are preferably averaged and amplified by the sensor, are transmitted to a controller that responds by increasing or decreasing the rate of air flow through the duct by opening or closing a damper located downstream from the sensor.

Typical examples of multi-point, center-averaging airflow sensors are disclosed in U.S. Pat. No. 4,453,419 (Engelke) and U.S. Pat. No. 5,481,925 (Woodbury). The sensor disclosed by Engelke comprises a number of pairs of tubes extending radially outwardly from a central hub. One tube of each pair has upstream facing holes and transmits a total pressure signal to a first chamber in the central hub, while the other tube of each pair has downstream facing holes and transmits a static pressure signal to a second chamber in the central hub. The total pressure signals and static pressure signals are averaged and amplified in respective chambers of the hub and are then transmitted to a controller. The Woodbury sensor is similar to that of Engelke except the total and static pressure sensing tubes are not paired and only a single static pressure port is provided at the radially outermost end of each static pressure sensing tube.

Most known airflow sensors operate on a principle similar to that of a standard Pivot tube, traversing the air stream and measuring the pressure at a number of locations in the duct. Such sensors are capable of generating reasonably accurate pressure measurements when the airflow pattern through the duct is substantially symmetrical, that is, when the velocity of air flowing through the duct exhibits a parabolic distribution across the duct section, with the maximum velocity at the center of the duct and the minimum at the walls of the duct.

While symmetrical airflow conditions may exist in relatively long, straight portions of the duct system, the presence of obstructions such as elbows, transitions, flexible ducts and dampers in the duct system cause turbulence that disrupt the symmetrical airflow pattern, and can have a negative impact on the accuracy of the pressure measurements generated by the duct.

Another problem associated with known airflow sensors is that the sensor itself can be responsible for a certain amount of turbulence in the duct system. Sensor-generated turbulence causes a drop in pressure across the sensor, as well as noise in the duct system.

Yet another problem associated with known airflow sensors relates to durability. Airflow sensors are typically supplied by manufacturers as assemblies comprising a sensor installed in either a short sheet-metal sleeve or a terminal box to be incorporated into the duct system. When such assemblies are manually moved from place to place on a job site, it is not uncommon for the assembly to be lifted and carried by grasping one of the arms of the sensor. Since sensor tubes are typically of small diameter (to reduce sensor surface area and minimize flow disruption), they are easily damaged by such handling, the result being that the measurements generated by the sensor may be inaccurate.

Advances have recently been made in the prior art towards overcoming these problems.

Of note in this regard is U.S. Pat. No. 6,237,426 (Gryc et al.). Gryc et al. discloses that under asymmetric air flow conditions, total and static pressure measurements made close to the walls of the duct are poor indicators of actual air flow within the duct. Thus, in the sensor Gryc et al., static and total pressure ports are located a sufficient distance from the walls of the duct so as to generate pressure measurements of acceptable accuracy even under asymmetric flow conditions. Gryc et al. also explains that damper back pressure results in static pressure measurement inaccuracy.

To avoid the problem of static pressure measurements being affected by damper back pressure, static pressure ports are provided on a side surface of the sensor. Gryc et al. also make advances in terms of durability through the use of metal braces. Further, the Gryc et al. sensor provides for signal amplification without increasing face area, unlike Engelke and Woodbury, by experimentally-determined optimum location of total pressure ports.

Despite the advances represented by the Gryc et al. sensor, there is an associated increased manufacturing cost. Thus, improvement to the technology remains of interest.

SUMMARY OF THE INVENTION

The present invention provides an airflow sensor capable of generating accurate pressure measurements under symmetrical and asymmetrical airflow conditions, which has strength sufficient to withstand relatively rough handling prior to installation, and which is relatively inexpensive to manufacture as compared to prior art sensors of similar utility. The airflow sensor is for use in a flow conduit having a flow direction and upstream and downstream directions defined by a flow direction, and comprises a first portion, a second portion and a third portion. The first, second, and third portions are disposed in stacked relation to one another and positioned, in use, in the flow conduit to define a hub and a plurality of sensor tubes. The hub is centrally disposed in said flow conduit, and has a first interior chamber, a second interior chamber, a streamlined upstream-facing surface, a downstream-facing surface and a sidewall connecting said upstream-facing surface and said downstream-facing surface. The sidewall has defined therein one or more static pressure ports. The first interior chamber communicates with the interior of the flow conduit through said one or more static pressure ports. The plurality of sensor tubes extend radially outwardly from said hub, transverse to the flow direction. Each tube can have: a streamlined upstream-facing surface having defined therein one or more total pressure ports; a downstream-facing surface; an interior passage communicating with the second interior chamber of the hub and communicating with the interior of the flow conduit through the one or more total pressure ports; and an end portion. Each of the one or more static pressure ports is located in the downstream direction relative to one of the respective sensor tubes.

Advantages, features and characteristics of the present invention, as well as methods of operation and functions of the related elements of the structure, and the combination of parts and economies of manufacture, will become more apparent upon consideration of the following detailed description with reference to the accompanying drawings, the latter being described hereinafter.

DETAILED DESCRIPTION OF A PREFERRED EMBODIMENT

Figures 1, 2:
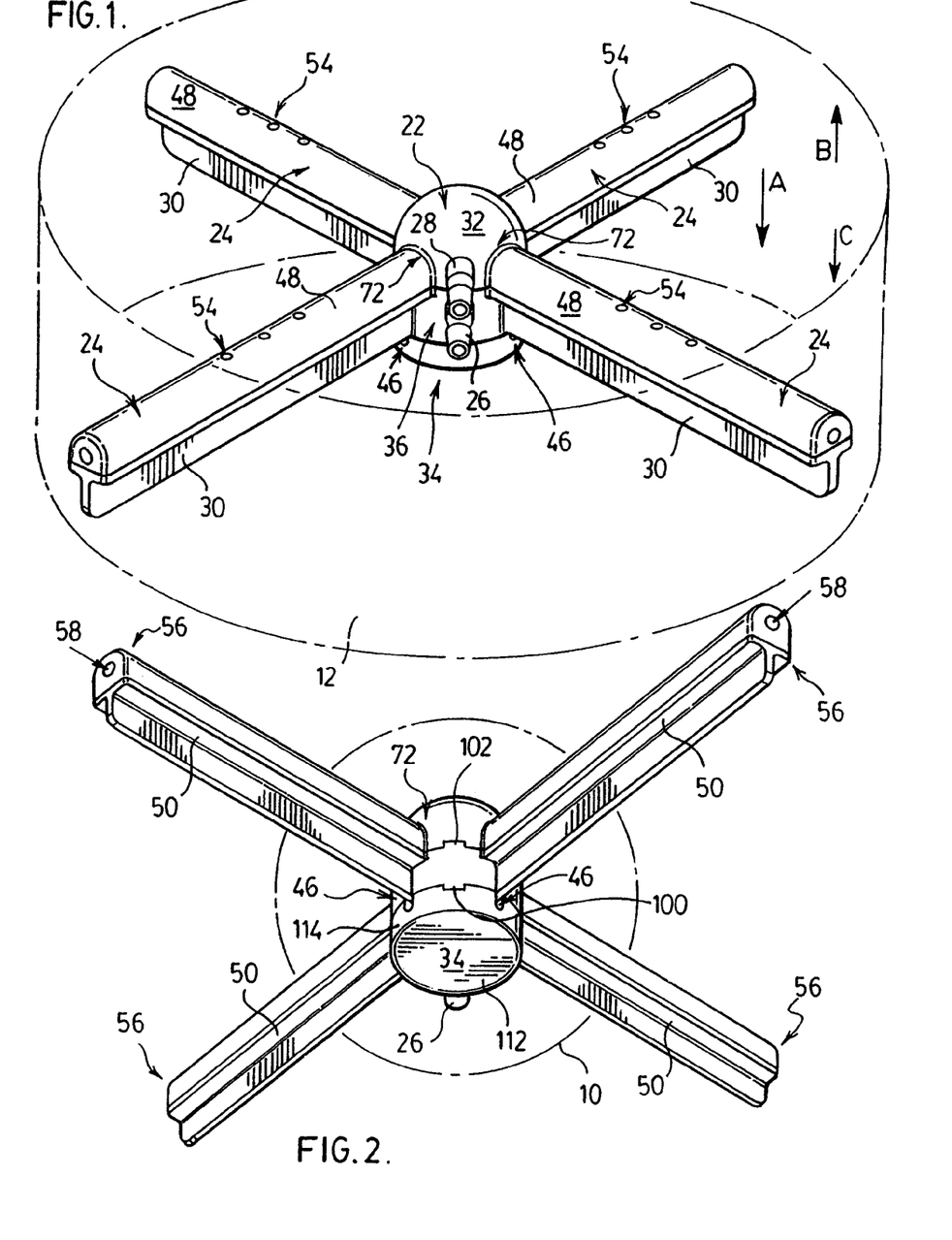
FIG. 1. is a top perspective view of a sensor constructed according to a preferred embodiment of the present invention installed in a section of duct, the duct being shown in phantom outline, for clarity.
FIG. 2 is a bottom perspective view of the sensor of FIG. 1.

The present invention should be understood for use in a duct or flow conduit 12 having a flow direction A, and upstream B and downstream C directions defined by the flow direction A, as shown representatively in FIG. 1. An airflow sensor 20 constructed according to a preferred embodiment of the present invention, as shown in FIG. 1, is hereinafter described in an operative position thereof. A description of sensor 20 in use follows, which is thereafter followed by a detailed discussion of the construction of sensor 20.

Figures 3, 4:
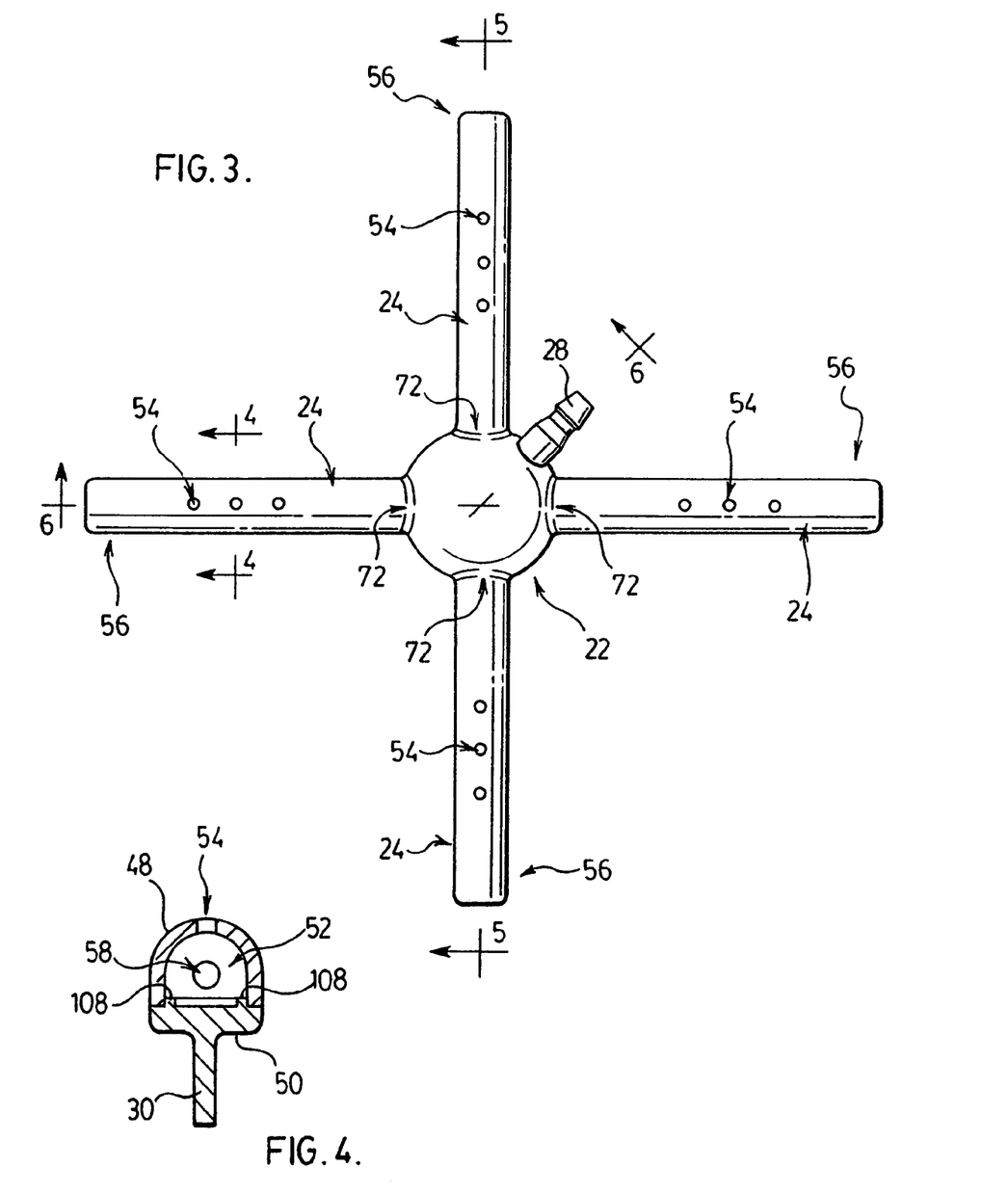
FIG. 3 is a top plan view of the sensor of FIG. 1.
FIG. 4 is a cross-sectional view along line 4—4 in FIG. 3.

With general reference to FIG. 1, FIG. 2 and FIG. 3, the airflow sensor 20 has: a hub 22, a plurality of sensor tubes 24, preferably, four sensor tubes 24, extending radially outwardly from said hub 22, angularly spaced about 90° from one other; a first fitting 26; a second fitting 28; and a plurality of reinforcing blades 30, preferably, four reinforcing blades 30. Hub 22 is centrally disposed in flow conduit 12 and has an upstream-facing surface 32 (presenting in a direction B opposite to the flow direction A), a downstream-facing surface 34 (presenting in a direction C parallel to the flow direction A), and a sidewall 36.

Figure 5:
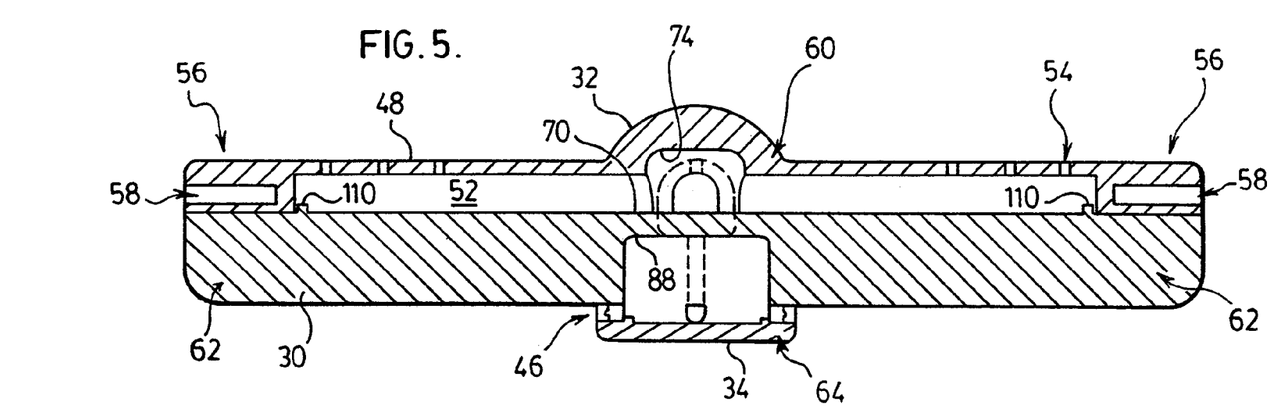
FIG. 5 is a cross-sectional view along line 5—5 in FIG. 3.
Figure 6:
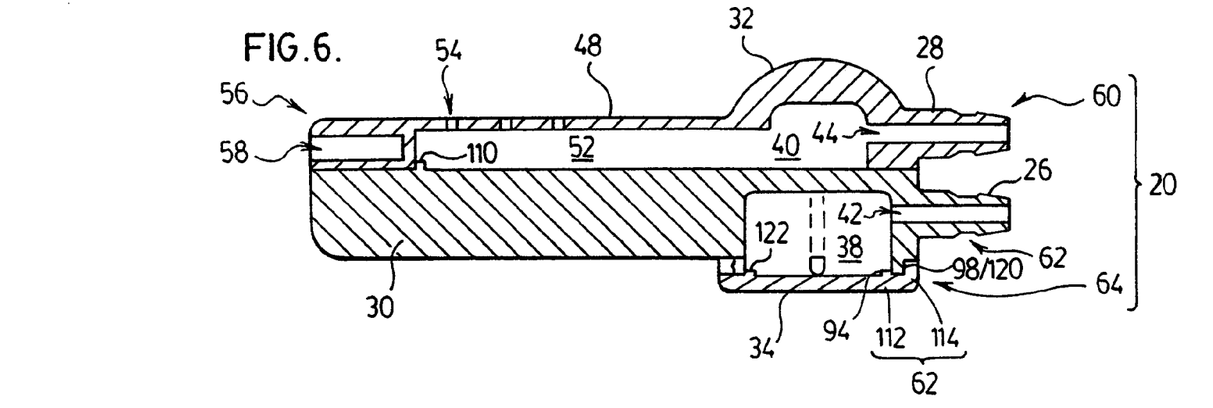
FIG. 6 is a cross-sectional view along line 6—6 in FIG. 3.

As best seen in FIG. 6, hub 22 defines a first interior chamber 38, a second interior chamber 40, a first gas channel 42 and a second gas channel 44. As shown in FIG. 1 and FIG. 2, upstream-facing surface 32 is streamlined, preferably rounded. Downstream-facing surface 34 is generally flat and is preferably orientated normal to flow direction A. Sidewall 36 connects upstream-facing surface 32 and downstream-facing surface 34; is cylindrical, and axially aligned with flow direction A, with a preferred diameter of about 1.1 inches; and has defined therein one or more static pressure ports 46, preferably four static pressure ports 46, angularly spaced from one another by about 90°. Static pressure ports 46 are U-shaped in cross-section and have a preferred width of about 0.09 inches. As best seen in FIGS. 5,6, the first interior chamber 38 communicates with the flow conduit interior through the static pressure ports 46. The first gas channel 42 extends outwardly from first interior chamber 38 and has a preferred diameter of about 0.1 inches, and second gas channel 44 extends outwardly from second interior chamber 40 and has a preferred diameter of about 0.1 inches.

With general reference to FIG. 1–FIG. 4, sensor tubes 24 extend transverse to flow direction A, that is, across the direction of flow. Tubes 24 extend from hub 22 to flow conduit 12 and are angularly spaced about hub 22. Each tube 24 has an upstream-facing surface 48, a downstream-facing surface 50 and an interior passage 52. Upstream-facing surface 48 is streamlined, preferably rounded, and has defined therein one or more total pressure ports 54, preferably three total pressure ports 54, described fully in the following paragraph. Downstream-facing surface 50 is substantially flat, and orientated normal to the flow direction A. A preferred width of each tube 24 is about 0.35 to 0.40 inches, more preferably about 0.375 inches, measured across its flat downstream surface 50 in the transverse direction; the preferred thickness of each tube 24 is about 0.35 to 0.40 inches, more preferably about 0.39 inches measured in the flow direction A. As shown in FIG. 4, the interior cross-section of each tube 24 is substantially semi-circular, with a preferred diameter of about 0.25 inches, the minimum thickness of the walls of the tubes 24 preferably being about 0.04 inches. Each sensor tube 24 has an outermost end portion 56 having a bore 58 formed therein. The bore 58 preferably has a diameter of about 0.1 inches and a depth of about 0.5 inches.

Three total pressure ports 54 are provided angularly aligned along the center of the upstream facing surface 48 of tube 24, the diameter of the total pressure ports 54 preferably being about 0.06 inches. The total pressure ports 54 are arranged on each tube 24 in an evenly spaced arrangement. The spacing between adjacent ports 54 is preferably about 10 percent of the tube length. The radial distance between the radially outermost total pressure port 54 and the duct 12, expressed in relative terms, is preferably about 30–35 percent of the length of tube 24.

As best seen in FIG. 6, first fitting 26, which is shown as a barbed fitting, communicates with first gas channel 42.

Second fitting 28, which is also shown as a barbed fitting, communicates with second gas channel 44, and is disposed such that first fitting 26 is downstream from second fitting 26. It will be appreciated that the fittings 18 and 20 are not necessarily barbed and may be of any desired configuration suitable for attachment to conduits (not shown) such as flexible tubing.

Plurality of reinforcing blades 30 are provided one for each sensor tube 24, each blade 30 being associated with the sensor tube 24 for which it is provided, extending along and downstream from said tube 24 and having a preferred thickness, measured in the transverse direction, of about 0.1 inches. Blades 30 extend radially along the center of each tube 24 and extend downstream such that each static pressure port 46 is located downstream from a tube 24, as evident in FIG. 1.

In use, air flowing into total pressure ports 54 of the sensor tubes 24 creates high pressure signals which are approximately equal to the static pressure of the air plus the velocity pressure. The high pressure signals are transmitted through the interior passages 52 of the sensor tubes 24 to the second interior chamber 40 in hub 22. Since tubes 24 are spaced within the duct 12 and total pressure ports 54 are spaced along tubes 24, sensor 20 detects total pressure at various areas of the duct 12. These pressure signals created in the tubes 24 are resolved into an average high pressure signal in second interior chamber 40 and transmitted through the second gas channel 44 to the second fitting 28. Similarly, the static pressure signals from the static pressure ports 46, which are relatively noise-free, having been shielded by blades 30, are resolved into an average static pressure signal in first interior chamber 38 and transmitted through the first gas channel 42 to first fitting 26.

From the above, it will be evident that the present invention has substantial usefulness. Sensor 20 can be mounted in a duct system upstream of a damper, which is pivotable within the duct to reduce or increase flow of air through the duct system, and flexible tubes can be connected to the first fitting 26 and second fitting 28, to pass outwardly through a hole or holes provided in the duct to the high and low pressure ports of a controller, which can control the operation of a damper in a known manner. Examples of suitable dampers and controllers are discussed and shown in the above-mentioned Engelke and Woodbury patents, which are incorporated herein by reference. The mounting of the sensor can conveniently be effected through the use of self tapping screws, which extend through the duct into the bores 58 provided in the end portions 56 of the sensor tubes 24.

Turning now the details of construction, it will be evident to persons of ordinary skill in the art that sensor 20 shown is of a three piece construction, comprising a first portion 60, a second portion 62 and a third portion 64, best indicated in FIG. 6.

Figure 7:
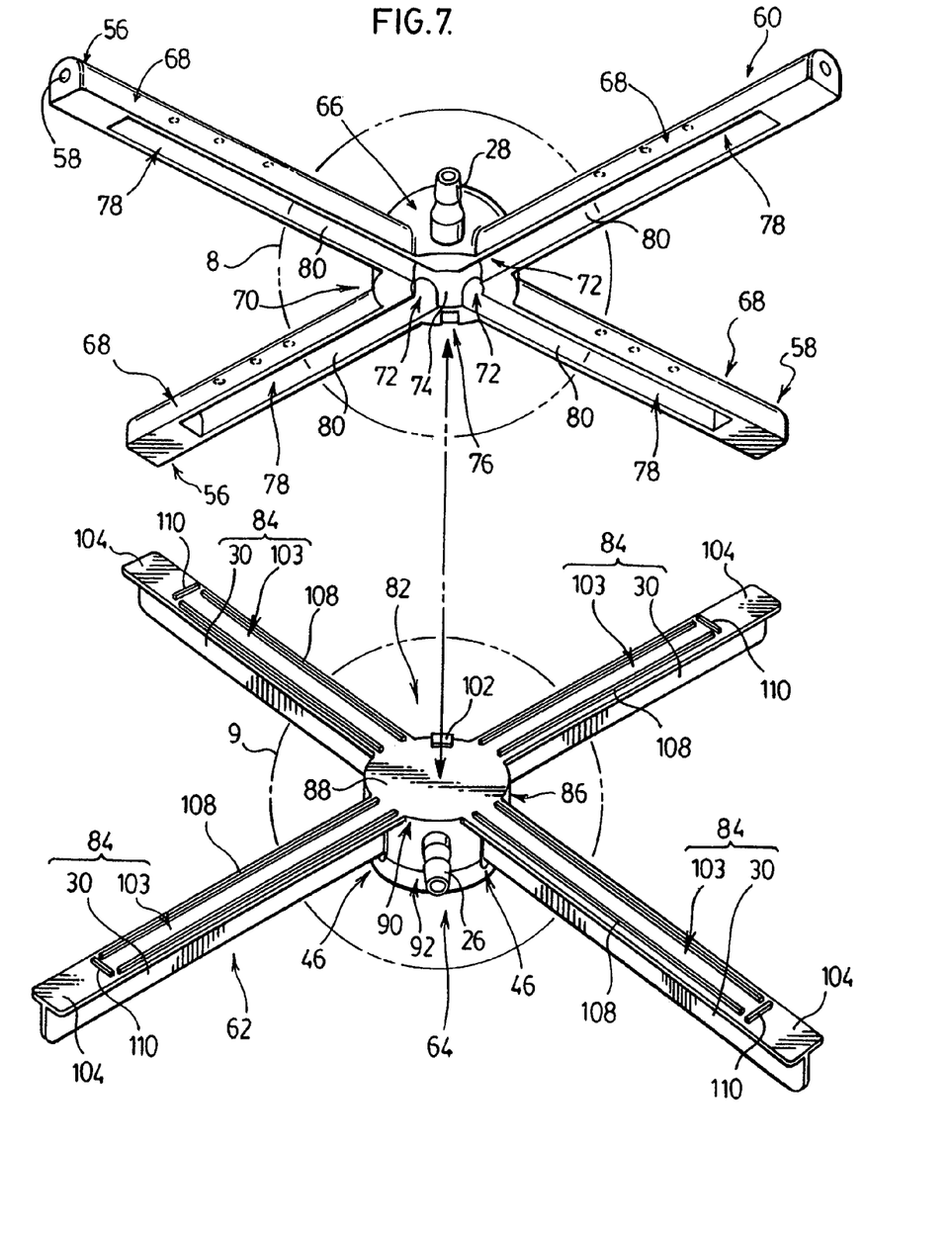
FIG. 7 is a partially exploded isometric view of the sensor of FIG. 1.
Figure 8:
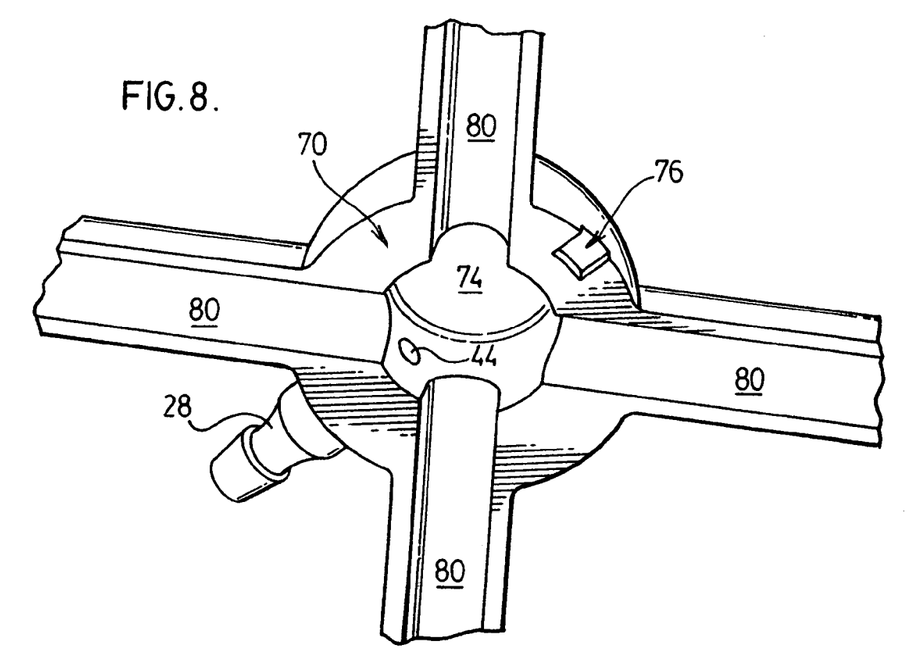
FIG. 8 is an enlarged view of encircled structure 8 in FIG. 7, from a different vantage point.

As well indicated in FIG. 7, first portion 60 has a central part 66; a plurality of arm parts 68 extending from central part 66 and provided one for each tube 24 and forming part thereof; and second fitting 28. Central part 66 is in the form of a bowl 66 having a rim 70 provided with a number of notches 72, which bowl defines the upstream-facing surface 32 of the hub 22 and a concave chamber-forming surface 74. Rim 70 of the bowl 66 has a keyway 76. Central part 66 also defines the second gas channel 44, as indicated in FIG. 8. With reference to FIG. 7, each arm part 68 extends from a respective notch 72 in the bowl 66, and has an end portion 56 that corresponds with end portion 56 of tube 24 of which said each arm part 68 forms part. Exclusive of its end portion 56, each arm part 68 has a C-shaped cross-section, such that said each arm part 68 defines an elongate trough 78. Outer convex surface of arm part 68 defines upstream-facing surface 48 of sensor tube 24 of which said arm part 68 forms part. Arm part 78 also has an inner concave surface 80. Arm part 68 also defines the total pressure ports 54 of said sensor tube 24. First portion 60 is molded in one piece out of a rigid polymer such as acrylonitrile-butadiene-styrene (ABS) or polyvinyl chloride (PVC).

As indicated in FIG. 7, second portion 62 has a central part 82; a plurality of arm parts 84 extending from central part 82 and provided one for each art part and forming part thereof; and first fitting 26.

Figure 9:
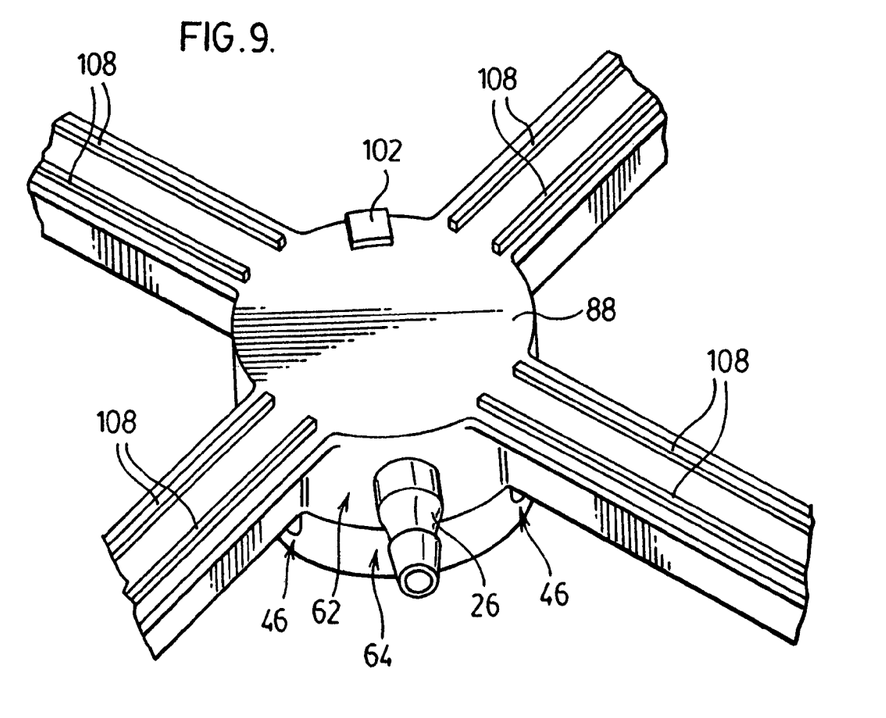
FIG. 9 is an enlarged view of encircled structure 9 in FIG. 7.
Figure 10:
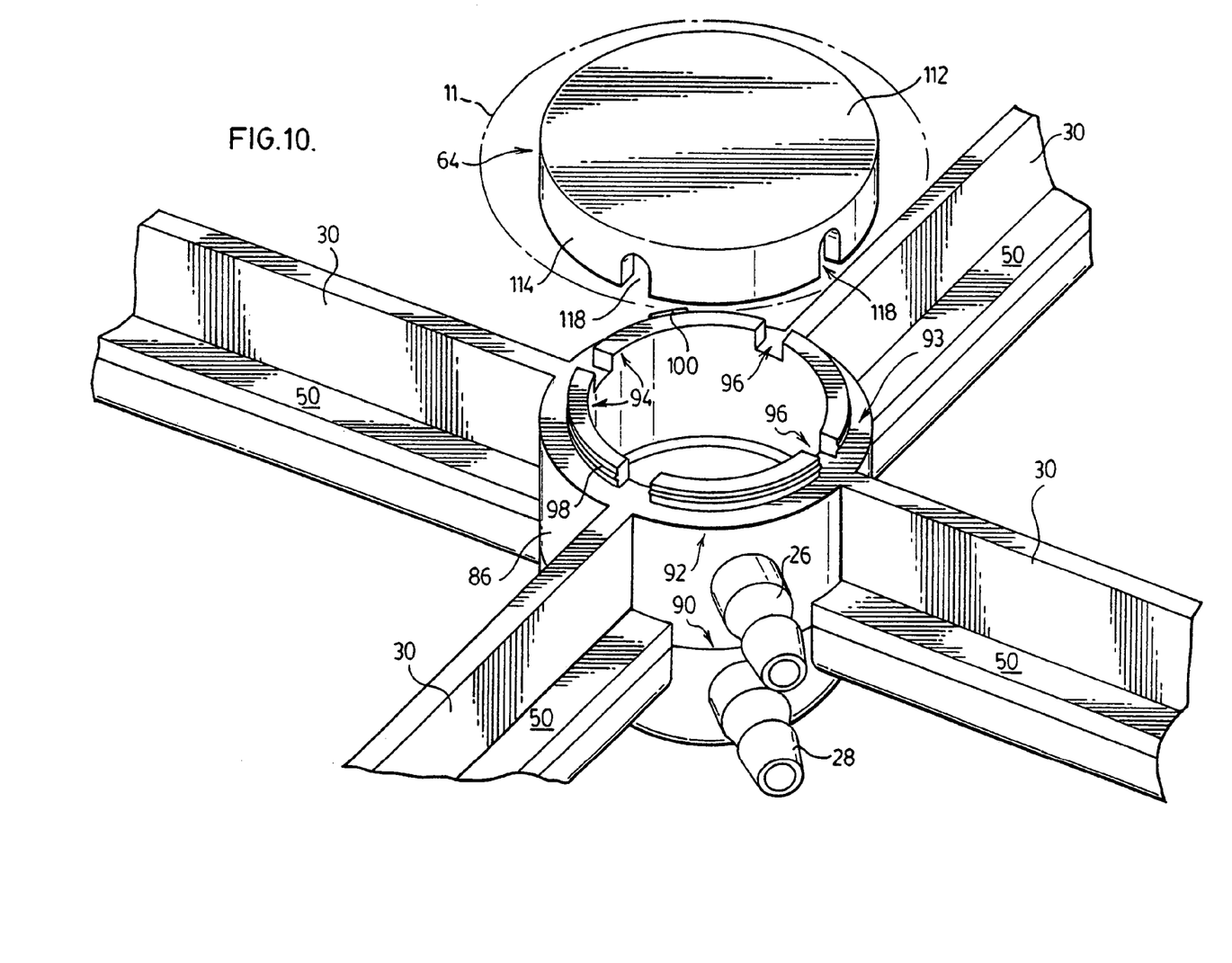
FIG. 10 is a partially exploded view of encircled structure 10 in FIG. 2, from a different vantage point.

With reference to FIGS. 7, 9, 10 central part 82 is in the form of a canister including a tubular outer wall portion 86 and a circular end wall portion 88.

Tubular outer wall portion 86 has a first end 90 and a second end 92 and defines exteriorly part of sidewall 36 of hub 22. Second end 92 terminates in a rim 93. End wall portion 88 occludes first end 90 of outer wall portion 86. Central part 82 of the second portion 62 has a boss 94 projecting from and along rim 93, boss 94 having formed therein interruptions 96 and also having a radially-outwardly projecting ridge 98. Rim 93 of canister 82 has a first key 100, and a second key 102 is provided on end wall portion 88 of canister 82.

Each arm part 84 of the second portion has a substantially planar portion 103, a flange portion, a pair of radial detents 108 and a transverse detent 110. Planar portion 103 has a first face which defines the downstream-facing surface 50 of tube 24 of which said each arm part 84 forms part and a second, opposite face 104. Flange portion extends from the first face and defines the reinforcing blade 30 for sensor tube 24 of which said each arm part 84 forms part. Radial detents 108 are elongate, project from second face 104 of planar portion 103 of said each arm portion 84, and are aligned so as to extend, in parallel relation to one another, radially-outwardly relative to central part 82 of second portion 62. Transverse detent 110 is elongate, projects from second face 104 of planar portion 103 of said each arm part 84 in the same direction as radial detents 108; is aligned so as to extend in transverse relation to radial detents 108; and is disposed adjacent to and radially outwardly from radial detents 108. Second portion 62 is molded in a single piece out of ABS or PVC.

Figure 11:
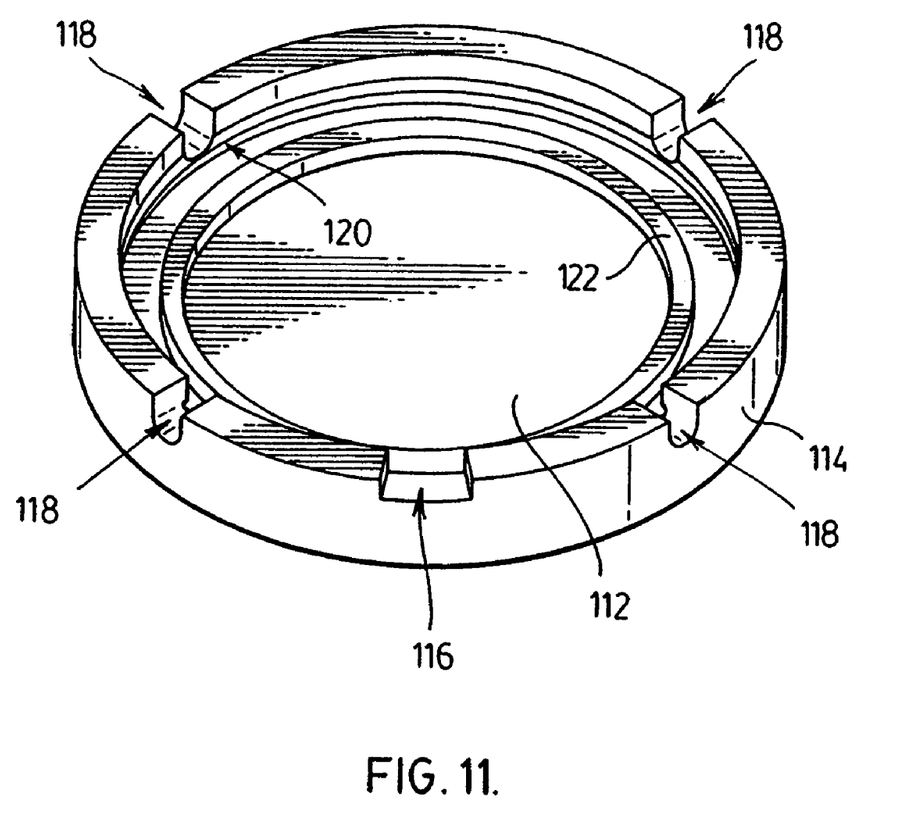
FIG. 11 is a perspective view of encircled structure 11 in FIG. 10, from a different vantage point.

With reference to FIG. 11, third portion 64 includes a circular plate portion 112 and an annular skirt 114 extending from and around the periphery of circular plate portion 112. Circular plate portion 112 is provided with an interior annular ridge 122. The skirt is provided with a keyway 116, circumferentially-spaced notches 118 and an interior, radially-inwardly facing annular groove 120. Third portion 64 is molded in a single piece out of ABS or PVC.

In use, first portion 60, second portion 62 and third portion 64 are disposed in stacked relation to one another and sealed to one another in a conventional manner, such as by adhesive.

The interrelation of first portion 60 and second portion 62 in use is detailed below.

As best seen in FIG. 5, end wall 88 of canister 82 is seated in sealing contact against rim 70 of bowl 66, such that chamber forming surface 74 and end wall portion 88 define second interior chamber 40. As indicated best in FIG. 2, key 102 is seated in keyway 76, to restrain first 60 and second 62 portions against rotation. In each sensor tube 24, arm part 68 of first portion 60 and arm part 84 of second portion 62 are in sealing contact with and associated with one another such that second face 104 of planar portion 103 and inner concave surface 80 define interior passage 52 of said tube 24. Each arm part 84 of second portion 62 has its radial detents 108 disposed in and frictionally-engaging opposite sides of trough 78 of arm part 68 of first portion 60 associated therewith, as shown in FIG. 4. Similarly, each arm part 84 of second portion 62 has its transverse detent 110 disposed in and frictionally-engaging end portion 56 of arm part 68 of first portion 60 associated therewith, as shown in FIG. 5 and FIG. 6.

The interrelation of the second portion 62 and third portion 64 in use is clearly seen in FIG. 4, FIG. 5 and FIG. 6. In use, skirt 114 is disposed in overlapping relation with boss 94, such that plate 112 occludes second end 92 of outer wall portion 86, to define the first interior chamber 38. Ridge 98 on boss 94 is engaged in groove 120 of skirt 114, to provide for mechanical engagement between portions 62 and 64. Key 100 of rim 93 is seated in keyway 116 in skirt 114 of third portion 64, to fix the orientation of second portion 62 and third portion 64 to one another, such that interruptions 96 in boss 94 are aligned with the notches 118 in skirt 114, thereby to define the static pressure ports 46.

Although the invention has been described in relation to a single preferred embodiment, it is to be understood that modifications can readily be made thereto. For example, although the duct shown in the drawings has a circular cross-section, it will be appreciated that the sensor can readily be employed in ducts having other cross-sections, such as rectangular. Further, whereas various dimensions have been indicated in the disclosure, modification to such dimensions can be readily made, although it is usually preferable to minimize the area of the sensor, particularly when viewed in the direction of the flow axis, to minimize flow disruption. It is noted the inventors have found hubs of substantially smaller diameters may not achieve proper averaging. As a further modification, whereas four sensor tubes are shown, in larger ducts, it may be advantageous to employ additional sensor tubes. Also, whereas the sensor tubes are indicated to extend transverse to the flow, such extension may not occur at perfect right angles to the flow. Routine modifications can also be made in terms of the quantity and placement of ports; U.S. Pat. No. 6,237,426 is incorporated herein by reference. Further, whereas the first portion, second portion and third portion are described herein as being made molded in a single operation, this is not necessary. The gas channels and bores, for example, could be bored rather than molded, and the fittings could be separate molded parts secured to the bowl and canister, respectively, in a conventional manner. Yet further, whereas the disclosure teaches the use of ABS and PVC plastics for the first, second and third portions, it should be understood that other rigid, high-impact plastic materials could easily be substituted therefor. In view of all the foregoing, the invention should be understood as being limited only by the appended claims, purposively construed.

The invention claimed is:

1. An airflow sensor for use in a flow conduit having a flow direction and upstream and downstream directions defined by the flow direction, the airflow sensor comprising a first portion, a second portion and a third portion disposed in stacked relation upon one another and positioned, in use, in the flow conduit to define:
   a hub centrally disposed in said flow conduit, said hub having a first interior chamber, a second interior chamber, a streamlined upstream-facing surface, a downstream-facing surface and a sidewall connecting said upstream-facing surface and said downstream-facing surface, said sidewall having defined therein one or more static pressure ports, the first interior chamber communicating with the interior of the flow conduit through said one or more static pressure ports; and
   a plurality of sensor tubes extending radially outwardly from said hub, transverse to the flow direction, each tube having: a streamlined upstream-facing surface having defined therein one or more total pressure ports; a downstream-facing surface; an interior passage communicating with the second interior chamber of the hub and communicating with the interior of the flow conduit through said one or more total pressure ports; and an end portion,
   wherein each of said one or more static pressure ports is located in the downstream direction relative to a respective one of the sensor tubes.

2. The airflow sensor of claim 1, further comprising a plurality of reinforcing blades provided one for each sensor tube, each reinforcing blade extending along and downstream from the sensor tube for which it is provided and having a thickness less than a width of said sensor tube,
   wherein each of said one or more static pressure ports is located in the downstream direction relative to a respective one of the reinforcing blades.

3. The airflow sensor of claim 1, wherein a static pressure port is defined for each sensor tube.

4. The airflow sensor of claim 1, further comprising a first fitting and a second fitting and further defining a first gas channel providing for communication between the first interior chamber of the hub and the first fitting and a second gas channel providing for communication between the second interior chamber of the hub and the second fitting.

5. The airflow sensor of claim 2, wherein the second portion defines the reinforcing blades and the downstream-facing surface of each sensor tube.

6. The airflow sensor of claim 1, wherein the third portion defines the downstream-facing surface of the hub.

7. The airflow sensor of claim 1, wherein the first portion and the second portion together define the second interior chamber.

8. The airflow sensor of claim 1, wherein the second portion and the third portion together define the first interior chamber.

9. The airflow sensor of claim 4, wherein the first portion defines the second fitting and the second gas channel.

10. The airflow sensor of claim 4, wherein the second portion defines the first fitting and the first gas channel.

11. The airflow sensor of claim 2, wherein each of the first portion and second portion includes: a central part; and a plurality of arm parts extending from the central part, the arm parts being provided one for each tube and forming part thereof.

12. The airflow sensor of claim 11, wherein the central part of the first portion, the central part of the second portion and the third portion together define the hub.

13. The airflow sensor of claim 11, wherein each arm part of the first portion has an end portion that defines the end portion of the tube of which said each arm part forms part, and wherein, exclusive of its end portion, said each arm part has a C-shaped cross-section, such that said each arm part defines an elongate trough, an outer convex surface of the arm part defining the upstream-facing surface of said tube.

14. The airflow sensor of claim 13, wherein each arm part of the second portion has:
   a substantially planar portion having: a first face which defines the downstream-facing surface of the sensor tube of which said each arm part forms part; and an opposite, second face which defines, in combination with a concave inner surface of the arm part of the first portion which forms part of said sensor tube, the interior passage of said each sensor tube; and
   a flange portion extending from the first face which defines the reinforcing blade for said sensor tube.

15. The airflow sensor of claim 14, wherein
   each arm part of the second portion has a pair of elongate radial detents which project from the second face of the planar portion of said each arm portion, the radial detents being aligned so as to extend, in parallel relation to one another, radially-outwardly from the central part of the second portion; and in each sensor tube, the radial detents of the arm part of the second portion forming part of said each sensor tube are disposed in and frictionally-engage opposite sides of the trough of the arm part of the first portion which forms part of said each tube.

16. The airflow sensor of claim 14, wherein each arm part of the second portion has a transverse detent which is elongate, projects from the second face of the planar portion of said each arm portion in the same direction as the radial detents; is aligned so as to extend in transverse relation to the radial detents; and is disposed adjacent to and radially-outwardly from the radial detents; and in each sensor tube, the transverse detent of the arm part of the second portion forming part of said each sensor tube is disposed in and frictionally-engages the end portion of the arm part of the first portion which forms part of said each tube.

17. The airflow sensor of claim 1, wherein the central part of the second portion includes a tubular outer wall portion and a circular end wall portion, the tubular outer wall portion having a first end and a second end and defining exteriorly part of the sidewall of the sensor, the second end terminating in a rim, and the end wall portion occluding the first end of the outer wall portion and defining, in combination with the first portion, the second interior chamber.

18. The airflow sensor of claim 17, wherein the third portion includes a circular plate portion occluding the second end of the outer wall portion, thereby to define the first interior chamber.

19. The airflow sensor of claim 18, wherein the central part of the second portion has a boss projecting from and along the rim, and wherein the third portion includes an annular skirt extending from and around the periphery of the circular plate, in overlapping, mechanically-engaging relation, with the boss.

20. The airflow sensor of claim 19, wherein the boss is interrupted and the skirt is notched to define the static pressure ports.

* * * * *